United States Patent
Pierce

(10) Patent No.: US 9,014,689 B1
(45) Date of Patent: *Apr. 21, 2015

(54) METHOD AND SYSTEM FOR OFFERING TO PROVIDE A FEMTOCELL TO A SUBSCRIBER

(75) Inventor: Matthew J. Pierce, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 450 days.

This patent is subject to a terminal disclaimer.

(21) Appl. No.: 13/546,724

(22) Filed: Jul. 11, 2012

(51) Int. Cl.
*H04W 24/00* (2009.01)
*H04W 28/16* (2009.01)

(52) U.S. Cl.
CPC ................................. *H04W 28/16* (2013.01)

(58) Field of Classification Search
USPC ........ 455/423, 406, 456.1, 456.3, 446, 422.1; 705/1.1, 345
See application file for complete search history.

(56) References Cited

U.S. PATENT DOCUMENTS

| | | | |
|---|---|---|---|
| 6,163,696 A | 12/2000 | Bi et al. | |
| 6,266,514 B1 | 7/2001 | O'Donnell | |
| 6,915,128 B1 | 7/2005 | Oh | |
| 7,076,245 B1 | 7/2006 | Satapathy | |
| 7,136,636 B1 | 11/2006 | McLaughlin | |
| 8,089,400 B1 | 1/2012 | Fang et al. | |
| 8,094,551 B2 | 1/2012 | Huber et al. | |
| 2002/0187792 A1 | 12/2002 | Kato et al. | |
| 2004/0219931 A1 | 11/2004 | Bi et al. | |
| 2005/0159171 A1 | 7/2005 | Kaneko | |
| 2007/0094042 A1* | 4/2007 | Ramer et al. | 705/1 |
| 2007/0149195 A1 | 6/2007 | Choe et al. | |
| 2008/0244148 A1 | 10/2008 | Nix, Jr. et al. | |
| 2009/0042536 A1* | 2/2009 | Bernard et al. | 455/406 |
| 2009/0061892 A1* | 3/2009 | Lee et al. | 455/456.1 |
| 2009/0213825 A1 | 8/2009 | Gupta et al. | |
| 2009/0253441 A1 | 10/2009 | Wallis | |
| 2009/0318132 A1* | 12/2009 | Chiou et al. | 455/423 |
| 2010/0035601 A1 | 2/2010 | Chen et al. | |
| 2010/0113035 A1 | 5/2010 | Eskicioglu et al. | |
| 2010/0157911 A1 | 6/2010 | Hegde et al. | |
| 2010/0178934 A1* | 7/2010 | Moeglein et al. | 455/456.1 |
| 2010/0184423 A1 | 7/2010 | Kent et al. | |

OTHER PUBLICATIONS

Unpublished U.S. Appl. No. 12/116,011, filed May 6, 2008, with inventors Debasish Sarkar et al., entitled "Performance Based Selection of Channel Elements for Use in a Wireless Network".

(Continued)

*Primary Examiner* — Mahendra Patel
*Assistant Examiner* — Natasha Cosme

(57) ABSTRACT

A method and system for offering to provide a femtocell to a subscriber is disclosed. The method includes a computer system making a first determination (i) that a level of wireless performance experienced by a mobile station of a subscriber at a given location is less than a threshold and (ii) that at least one cause of the level of wireless performance being less than the threshold level is a network issue rather than a mobile-station specific issue. The method further includes the computer system making a second determination that the given location is location associated with a billing address of the subscriber. The method then includes, in response to making the first and second determinations, the computer system initiating a process of offering to provide a femtocell to the subscriber.

21 Claims, 5 Drawing Sheets

(56) References Cited

OTHER PUBLICATIONS

Unpublished U.S. Appl. No. 12/725,716, filed Mar. 17, 2010, with inventors Joe B. Quint et al., entitled "Method and System for Offering a Femtocell to a Subscriber".

Lawson, Stephen, AT&T May Give Away MicroCells for Weakly Covered Homes, Jan. 21, 2011, retrieved from the World Wide Web on May 2, 2012 (http://www.pcworld.com/businesscenter/article/217385/atandt_may_give_away_microcells_for_weakly_covered_homes.html).

How CoverageMap results improves carriers' cellphone coverage; RootMetrics, retrieved from World Wide Web on Jul. 13, 2012 (http://www.rootmetrics.com/how-it-works/).

U.S. Appl. No. 12/725,716, Non-Final Office Action mailed Apr. 4, 2012.

U.S. Appl. No. 12/725,716, Final Office Action mailed Mar. 28, 2013.

* cited by examiner

METHOD AND SYSTEM FOR OFFERING TO PROVIDE A FEMTOCELL TO A SUBSCRIBER

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1×RTT networks" (or "1× networks" for short), which stands for "Single Carrier Radio Transmission Technology." Another CDMA protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, LTE, iDEN and/or any others.

These networks typically include a plurality of base stations, each of which provides one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g., voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

2. Femtocells

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g., IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g., in buildings) and for other reasons, macro-network service providers have begun offering consumers devices referred to herein as femtocells, which may also be referred to as femto base stations, femto base transceiver stations (BTSs), picocells (pico base stations, pico BTSs), microcells (micro base stations, micro BTSs), Low-Cost Internet Base Stations (LCIBs), and by other names. Note that the aforementioned terms that end in "cell" may also be generally and herein used to refer to the coverage area provided by the respective device. Note also that "low-cost" is not used as a limiting term; that is, devices of any cost may be categorized as LCIBs, though most LCIBs typically will be much less expensive on average than most macro-network base stations.

A typical femtocell may be approximately the size of a desktop phone or WiFi access point, and is essentially a low-power, low-capacity version of a macro base station. Thus, a typical femtocell will use a normal power outlet, perhaps with a transformer providing a DC power supply. The femtocell may have a wired (e.g., Ethernet) or wireless (e.g., WiFi) connection with the user's router, and would thus have connectivity to the Internet and/or one or more other packet-data networks via the user's broadband connection. A femtocell may establish a virtual-private-network (VPN) connection over the Internet with an entity (e.g., a VPN terminator) on the wireless-service (macro-network) provider's core network, and thereby be able to securely communicate via the VPN terminator with other entities on that core network and beyond.

The femtocell also has a wireless-communication (e.g., CDMA) interface that is compatible with the user's mobile station(s), such that the femtocell may act as a micro base station, providing coverage on the wireless-service provider's network via the user's Internet connection. Usually, a femtocell will provide service on a single RF carrier (or on a single carrier per technology, where multiple technologies (e.g., 1×RTT and EV-DO) are supported), and also transmit what is known as a pilot beacon, which includes administrative messages and parameters that mobile stations use to connect with the femtocell.

OVERVIEW

A subscriber may experience poor wireless performance at a given location for a variety of reasons. For example, the subscriber may experience poor wireless performance at a given location due to a network issue, such as poor macro-network wireless coverage at the given location. As another example, the subscriber may experience poor wireless performance at the given location due to a mobile-station specific issue, such as a defective mobile station component(s) that results in the poor wireless performance.

Femtocells are designed to have low transmission-power capabilities, and consequently to provide coverage areas that are relatively limited in comparison with those of typical macro base stations. As examples, a typical femtocell may be designed to provide a coverage area that is the size of a dorm room, an apartment, a house, and so on. When the subscriber experiences poor wireless coverage at a given location due to a network issue, the subscriber may experience improved wireless coverage at the given location if the subscriber uses a femtocell at the given location. For example, a subscriber may experience poor macro-network wireless coverage at the subscriber's home, and thus the subscriber may experience improved wireless coverage at the subscriber's home if the subscriber installs and uses a femtocell at the home.

On the other hand, when the subscriber experiences poor wireless performance at the given location due to a mobile-station specific issue, using a femtocell at the given location may not improve or substantially improve the poor wireless performance at the given location. Rather than offering to provide the subscriber a femtocell in such a situation, a more appropriate method to improve the wireless performance at the given location may be to remedy the mobile-station specific issue.

In the wireless-communication service, low customer satisfaction is a reason many subscribers leave a given wireless service provider. For example, subscribers with a low customer satisfaction may opt to switch to a different wireless service provider. Poor wireless performance at a given location where a subscriber often uses his or her mobile phone is likely to lead to low customer satisfaction. Improving wireless performance at such a location, however, may help to increase a subscriber's customer satisfaction and thus may help to prevent the subscriber from switching to a different wireless service provider.

Accordingly, disclosed herein is a method and system for identifying subscribers that may be good candidates for using a femtocell and responsively offering to provide a femtocell to the subscribers. In particular, the disclosed method and system focus on identifying subscribers that may benefit from using a femtocell at a location associated with the subscriber's account, such as a billing address of the account. In accordance with the method disclosed herein, a computer system initiates a process of offering a femtocell to a subscriber in response to determining (i) that the subscriber has experienced poor wireless performance at a location that is associated with the billing address of the subscriber's account and (ii) that at least one cause of the level of the poor wireless performance at the location is a network issue rather than a mobile-station specific issue.

In particular, the method includes a computer system making a first determination (i) that a level of wireless performance experienced by a mobile station of a subscriber at a given location is less than a threshold and (ii) that at least one cause of the level of wireless performance being less than the threshold level is a network issue rather than a mobile-station specific issue. The computer system also makes a second determination that the given location is location associated with a billing address of the subscriber. In response to the first and second determinations, the computer system initiates a process of offering to provide a femtocell to the subscriber. Offering to provide a femtocell to the subscriber may facilitate improving the subscriber's wireless performance at the billing address.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Introduction

As noted above, the disclosed method and system provide for identifying subscribers that may be good candidates for using a femtocell and offering to provide a femtocell to the subscribers. In particular, the disclosed method and system provide for identifying a mobile station that has experienced poor wireless performance at a location associated with the billing address of the mobile station's subscriber, where the poor wireless performance is due at least in part to a network issue rather than a mobile-station specific issue, and responsively offering to provide a femtocell to the subscriber.

The disclosed method and system may be of particular benefit to both subscribers of wireless service and wireless service providers. For example, the disclosed method and system may benefit a subscriber by leading to improved wireless coverage at the subscriber's billing address (e.g., the subscriber's house). As a result of improved coverage at the subscriber's address, the subscriber's customer satisfaction in the wireless service provider may increase. This increased customer satisfaction may benefit a wireless service provider by reducing or minimizing subscriber turnover due to low customer satisfaction. Further, by determining that at least one cause of the poor wireless performance is a network issue rather than a mobile-station specific issue before initiating a process of offering a femtocell, a wireless service provider may ensure that the wireless service provider does not offer a femtocell to a subscriber when the femtocell may not improve or substantially improve the wireless performance.

One approach of identifying a subscriber to which to offer a femtocell is described in a corresponding application, U.S. patent application Ser. No. 12/725,716, entitled "Method and System for Offering a Femtocell to a Subscriber," filed Mar. 17, 2010 (the '716 application), which is hereby incorporated herein by reference in its entirety. The '716 application is directed toward a method that involves initiating a process of offering to provide a femtocell to the subscriber responsive to (i) a first determination that a level of wireless performance experienced by a mobile station of a subscriber at a given location is less than a threshold and (ii) a second determination that the given location is a location associated with a billing address of the subscriber. The disclosed method and system of the present application is related to the method disclosed in the '716 application; however, the disclosed method and system of the present application beneficially also involves determining that at least one cause of the level of wireless performance being less than the threshold level is a network issue rather than a mobile-station specific issue.

2. Exemplary Communication System Architecture

Figure 1:
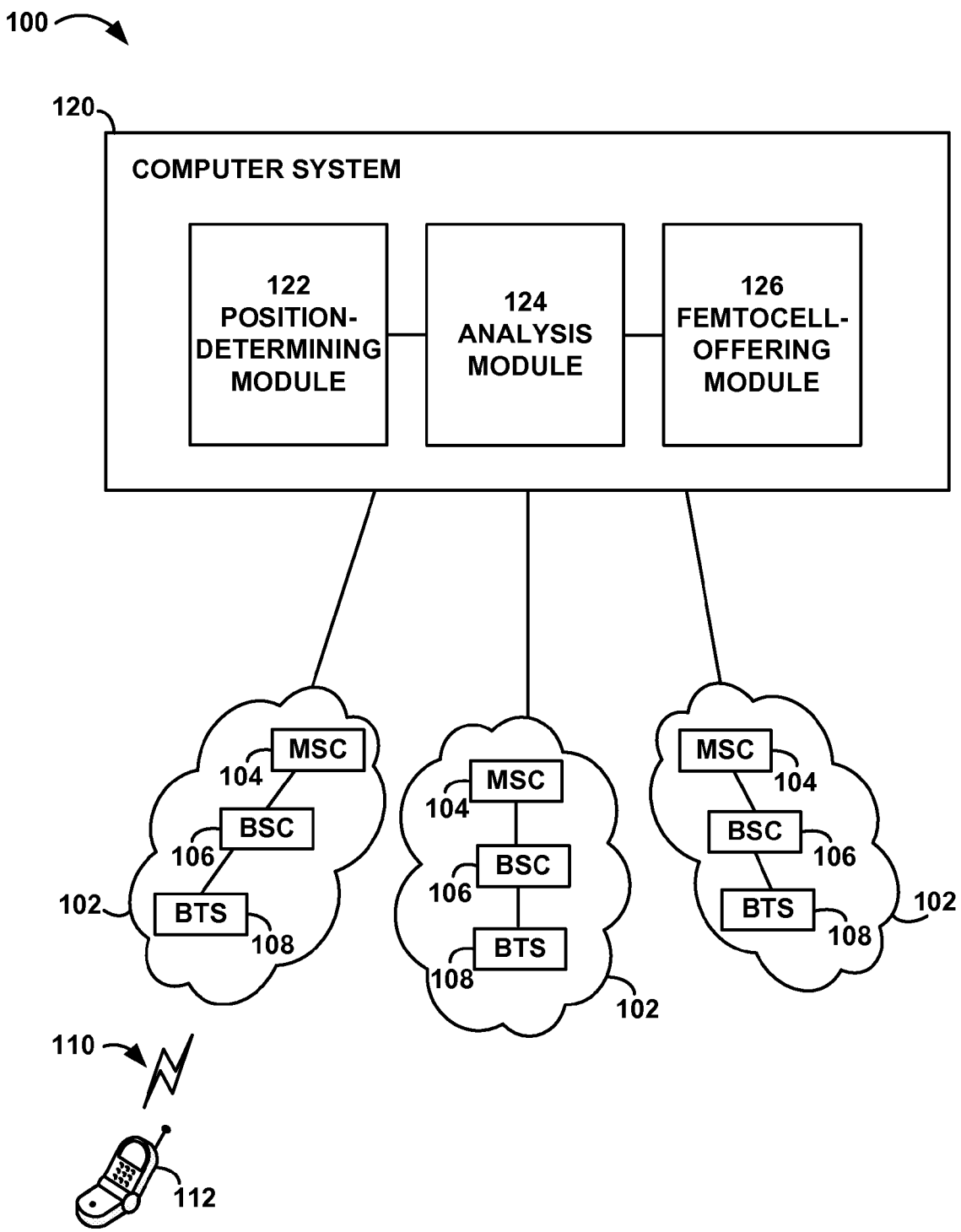
FIG. 1 is a simplified block diagram of a communication system in accordance with exemplary embodiments.

FIG. 1 is a simplified block diagram of a communication system in which the proposed method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium.

System 100 includes a number of radio access networks (RANs) 102, each of which is controlled by a switching entity such as a mobile switching center (MSC) 104. The MSC generally includes or connects with one or more base station controllers (BSCs) 106, which in turn connect with one or more base transceiver stations (BTSs) 108. Each BTS may include a cell tower with one or more antennas that radiate to define an air interface 110 in which mobile stations can operate. With this arrangement, mobile stations, such as mobile station 112, can communicate through RAN 102 with entities on a transport network such as a public switched telephone network (PSTN) or the Internet. Although depicted as only communicating through one RAN 102, mobile station 112 is also capable of communicating through the other RANs 102.

Mobile station 112 can take various forms, examples of which include a mobile phone, a personal digital assistant, a wirelessly equipped personal computer, or another wirelessly equipped device of any sort. Each RAN 102 generally functions to serve wireless mobile stations such as mobile station 112 and/or other mobile stations, so as to provide those devices with resources such as the ability to communicate with other entities (or with each other) via the RAN. As such, each RAN 102 may take various forms, the details of which are not critical and may depend on the air-interface protocol of the RAN 102 and on other factors.

System 100 also includes a computer system 120 that is in communication with each RAN 102 and that is operable to identify a subscriber who may benefit from using a femtocell at the subscriber's billing address and to facilitate offering to provide a femtocell to the subscriber. FIG. 1 depicts each RAN 102 communicating directly with computer system 120; however, in other examples, computer system 120 may communicate with each RAN 102 through a front-end communication node (not shown). In an embodiment and as shown in FIG. 1, the system 120 may have modules that are configured to perform various steps of the disclosed method. For example, position-determining module 122 may be configured to determine, for each of a plurality of mobile events of a mobile station of a given subscriber, a location where the mobile event occurred. Further, an analysis module 124 may be configured to make a first determination (i) that a level of wireless performance experienced by a mobile station of a subscriber at a given location is less than a threshold and (ii) that at least one cause of the level of wireless performance being less than the threshold level is a network issue rather than a mobile-station specific issue. The analysis module 124 may also be configured to make a second determination that the given location is location associated with a billing address of the subscriber. Still further, a femtocell-offering module 126 may be configured to initiate a process of offering to provide a femtocell to the subscriber responsive to the first and second determinations.

Figure 2:
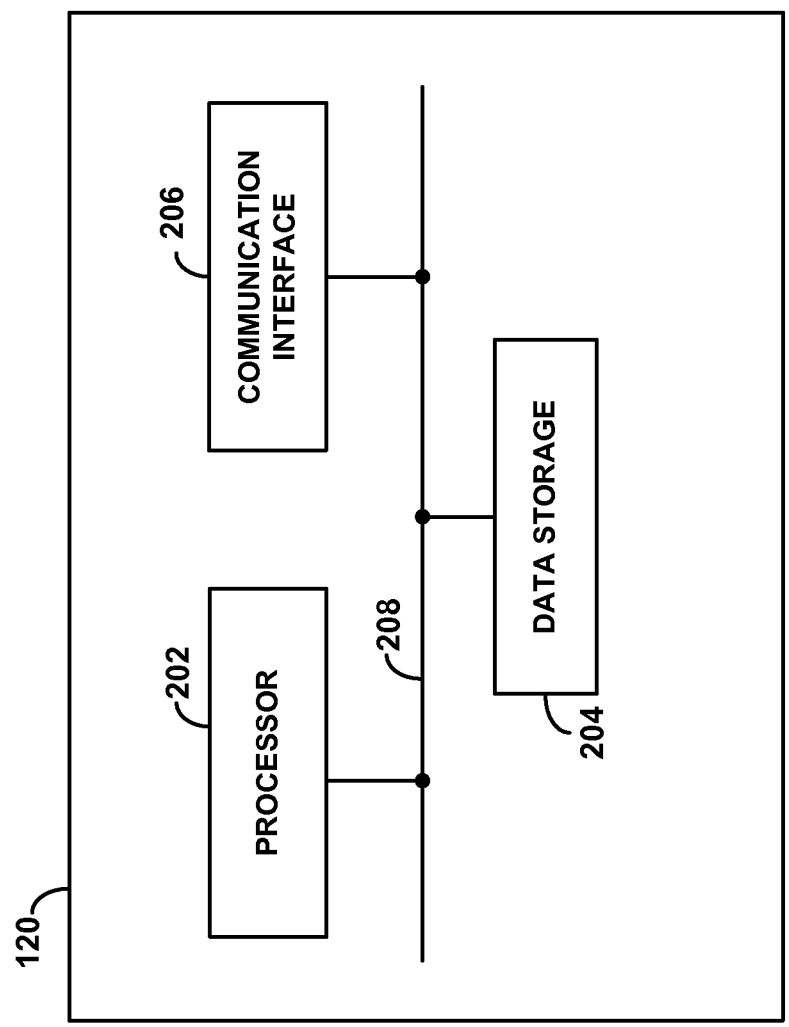
FIG. 2 is a simplified block diagram of an exemplary system for offering a femtocell to a subscriber that can be used in the arrangement of FIG. 1.

These modules 122, 124, and 126 may each share a single processor. For example, FIG. 2 depicts computer system 120, which includes modules 122, 124, 126, as including a single processor. However, in another example of the disclosed method and system, each module may include a single dedicated processor or dedicated processors configured for carrying out the described steps. Beneficially, including multiple processors in system 120 may increase the processing speed and power of system 120.

3. Exemplary Computer System Components

FIG. 2 is a block diagram of an exemplary system 120, illustrating some of the components that could be included in such a system to carry out the disclosed method. As shown in FIG. 2, the system 120 may include a processor 202, data storage 204, and a communication interface 206, all of which may be coupled together by a system bus or other mechanism 208.

Each of these components of the system 120 may take various forms. For instance, processor 202 could be one or more general purpose microprocessors and/or dedicated signal processors. Data storage 204 could be volatile and/or nonvolatile memory, such as flash memory. The communication interface 206 could include one or more antennas, chipsets, and/or other components for communicating with other entities in the wireless network. The system 120 could communicate through communication interface 206 with, for example, RAN 102.

In an example of the disclosed method, data storage 204 may hold billing address information for subscribers of a wireless service provider. Further, data storage 204 may hold wireless performance history data for a plurality of mobile station models. Data storage 204 also may hold a set of logic (e.g., computer instructions) executable by processor 202 to carry out various functions described herein. For example, system 120 may receive mobile event record data (e.g., Call Detail Record (CDR) data and/or Per Call Measurement Data (PCMD)) from RAN 102. Further, system 120 may receive network data (e.g., coverage data) and mobile station performance data (e.g., history of wireless performance for a given mobile-station model). Based at least on information from the received mobile event record data, network data, and/or mobile station performance data, processor 202 could make a first determination (i) that a level of wireless performance experienced by a mobile station of a given subscriber at a given location is less than a threshold level and (ii) that at least one cause of the level of wireless performance being less than the threshold level is a network issue rather than a mobile-station specific issue. The processor 202 could also make a second determination that the given location is location associated with a billing address of the given subscriber. Responsive to the first and second determinations, the processor 202 could initiate a process of offering to provide a femtocell to the given subscriber. In some embodiments of the disclosed method, one or more of these functions can be carried out by firmware and/or hardware.

In an example of the disclosed system, the computer system 120 comprises a plurality of computer modules. Each of the plurality of computer modules may be configured to make at least part of one or more of the various determinations of the disclosed method. For instance, and a first computer module may make the first determination and a second computer module may make the second determination. In another example, making the first determination may include (i) a first computer module determining that a level of wireless performance experienced by the mobile station when at a given location is less than a threshold level and (ii) a second computer module determining that at least one cause of the level of wireless performance being less than the threshold level is a network issue rather than a mobile-station specific issue. In an example, the computer system may be operated by a single entity. In another example, the computer system may be operated by a plurality of entities, such as a wireless service provider and a third party.

4. Exemplary Operation

Figure 3:
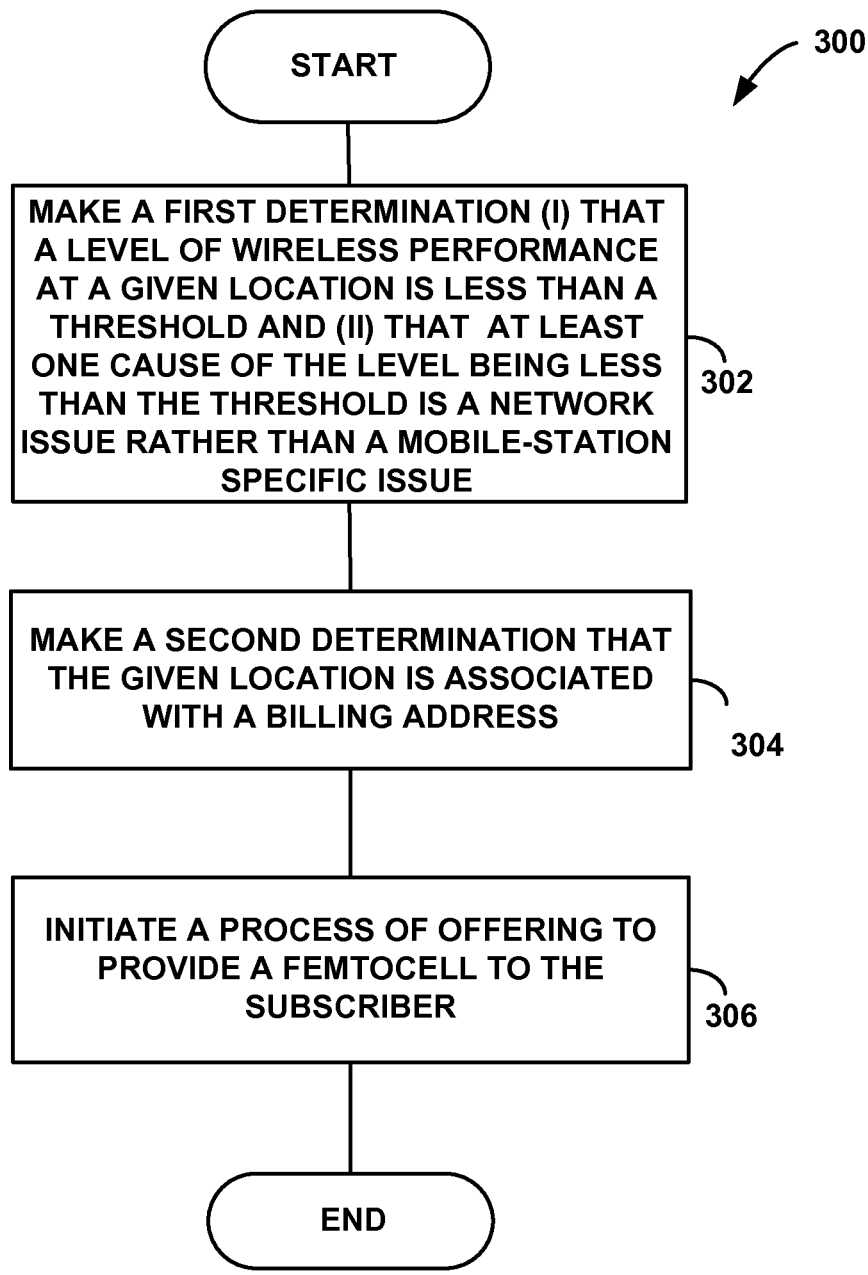
FIG. 3 is a flow chart of a method that can be carried out in accordance with exemplary embodiments.

Referring next to FIG. 3, a flow chart is provided to help illustrate some of the functions that can be carried out by a system configured to offer to provide a femtocell to a subscriber, such as computer system 120. FIG. 3 illustrates method 300, which is a method for identifying a subscriber that may benefit from using a femtocell at a location associated with the billing address of the subscriber and responsively offering to provide a femtocell to the identified subscriber.

As shown in FIG. 3, method 300 begins at step 302, where the computer system 120 makes a first determination (i) that a level of wireless performance experienced by a mobile station of a subscriber at a given location is less than a threshold and (ii) that at least one cause of the level of wireless performance being less than the threshold level is a network issue rather than a mobile-station specific issue. As mentioned above, the mobile station of a subscriber can take various forms, examples of which include a mobile phone, a personal digital assistant, a wirelessly equipped personal computer, or another wirelessly equipped device of any sort. At step 304, the computer system 120 makes a second determination that the given location is location associated with a billing address of the subscriber. Then, in response to the first and second determinations, at step 306, the computer system 120 initiates a process of offering to provide a femtocell to the subscriber.

i. Making the First Determination and the Second Determination

As mentioned above, at step 302, the system 120 may make a determination (i) that a level of wireless performance experienced by a mobile station of a subscriber at a given location is less than a threshold and (ii) that at least one cause of the level of wireless performance being less than the threshold level is a network issue rather than a mobile-station specific issue. Further, at step 304, the system 120 may make a second determination that the given location is location associated with a billing address of the subscriber. In method 300, the first determination may be made before the second determination and vice versa. Alternatively, the first and second determinations may be made concurrently. By making these first and second determinations, the system 120 may identify a subscriber to which to offer to provide a femtocell.

A. Determining that a Level of Wireless Performance at a Given Location is Less than a Threshold The system 120 may determine that a level of wireless performance experienced by a mobile station of a subscriber at a given location is less than a threshold in a variety of ways. In an example of method 300, in order to make the determination that a level of wireless performance experienced by a mobile station of a subscriber at a given location is less than a threshold, the system 120 may first identify a plurality of the mobile events of a mobile station of a given subscriber. The given subscriber may be, for example, the user of mobile station 112. System 120 may then identify the location of each of those identified mobile events. As is know in the art, a network switch, such as MSC 104, may collect mobile event record data (e.g., PCMD data), which may include data about the mobile events that occur in the network.

The mobile event record data may include data about the type of mobile event that occurred and various other data related to the mobile event. For the purposes of the disclosed method and system, a mobile event may be any mobile event of mobile station 112. For example, mobile events may include but are not limited to phone calls, text messages, and data usage. The mobile event record data may also include other data related to the mobile event, such as data related to the mobile device, the base station, the BSC, the MSC, and other components of the RAN involved with the mobile event. This data may include, for instance, the switch cell sector and a round trip delay measurement from a base station or base stations in the RAN. Such mobile event record data may also be data that is associated with negative mobile events. These negative mobile events may be any mobile event that affects the subscriber in an undesirable way and/or lowers customer satisfaction. For example, negative mobile events may include blocked calls, dropped calls, and roaming events. Other example negative mobile events are possible as well.

Negative mobile events may indicate wireless coverage issues and/or mobile-station specific issues. Negative mobile events may be recorded in the mobile event record data after the MSC or another entity in the RAN detects the negative mobile event. Detection of negative mobile events is well known in the art and thus is not described in great detail. However, as an example, with respect to dropped calls, usually a call-drop event occurs because the signal strength of RF signals received by the mobile station and/or by the base station becomes too low, and the RF link is lost. A mobile station may receive an RF signal having a low strength due to a network issue (e.g., poor coverage at the location) and/or a mobile-station specific issue (e.g., a defective mobile station component(s)). When this occurs, the MSC may record the dropped call. It should be noted, however, that other circumstances may cause a call-drop event as well.

MSC 104 may send mobile event record data related to mobile station 112 to system 120. After receiving the mobile event record data, system 120 may analyze the data to determine the location of each mobile event of mobile station 112. It should be noted that MSC 104 may collect and send to system 120 mobile event record data related to a plurality of mobile stations, and in such a case, the system 120 may perform the disclosed method for each of the plurality of mobile stations. The analysis of the mobile event record data is described in greater detail below with reference to position-determining module 122 and analysis module 124.

After receiving the mobile event record data for mobile station 112 from MSC 104, the position-determining module 122 may determine the location of all of the mobile events of mobile station 112. Determining the location of a mobile event based on mobile event record data is well known in the art and is thus not described in great detail. Generally, the position-determining module 122 may employ any of a variety of position-determining calculations. For example, position-determining module 122 may calculate location using a triangularization method (also commonly referred to as triangulation), which is well known in the art. Using a triangularization method, the position-determining module 122 may determine a geographic location of each mobile event (e.g., the latitude and longitude for each mobile event). In an example, the position determining module may calculate the latitude/longitude coordinates based on round-trip-delay data and base-station-antenna azimuth data. The mobile event data may include round-trip-delay data and base-station-antenna azimuth data with respect to two or more base stations.

These location calculations based on mobile event record data received from the MSC may be performed after the mobile event has actually occurred. However, in other examples of the disclosed method and as known in the art, location determination may take place during the time of the mobile event. For example, the MSC, perhaps in communication with a position-determining entity, may determine the location of each mobile event as the mobile event occurs. These entities may employ any of a variety of position-determining technologies to determine the location of mobile events. For instance, this location determination may be handset-based (e.g., Global Positioning System (GPS) technology) or network-based (e.g., triangularization). If location is determined at the time of the mobile event, an MSC may keep a location history log for a mobile station and may send the determined locations to system 120.

After identifying a location where each mobile event of mobile station 112 occurred, the analysis module 124 of system 120 may identify the mobile events that occurred at a given location. In an example of method 300, analysis module 124 may determine that a level of wireless performance at the given location is less than a threshold and then analysis module 124 may then make a determination that the given location is a location associated with a subscriber's billing address. However, in another example of method 300, after identifying the location of each mobile event of mobile station 112, analysis module 124 may determine that a given location is associated with a subscriber's billing address. The analysis module 124 may then compare the identified location of each mobile event to the subscriber's billing address to determine which mobile events occurred at the billing address. The analysis module 124 may then determine that a level of wireless performance at the billing address is less than a threshold.

The analysis module 124 may identify the location of the billing address in a variety of ways. For example, module 124 may identify the location of the billing address 412 by the latitude and longitude coordinates of the billing address. However, in another example, the analysis module 124 may identify the location of the billing address by the "zip+4" code of the billing address. Identifying the location of the billing address by the "zip+4" code rather than latitude and longitude coordinates will typically result in a more coarse location for the billing address. However, the accuracy of a "zip+4" identification is typically within approximately 100 meters.

It is contemplated that in most situations the billing address will be the home address of the subscriber. However, the billing address may be other location as well, such as a business address. Further, in some cases, multiple mobile stations may be associated with a billing address. For example, a subscriber may subscribe to what is commonly referred to as a "family plan." For instance, a parent may use a first mobile phone and a child may use a second mobile station, with both mobile stations being associated with the same billing address. In such a situation, the analysis module 124 may analyze the mobile events of both mobile stations to determine if at least one of the mobile stations experiences a level of wireless performance at the billing address that is less than a threshold.

Figure 4:
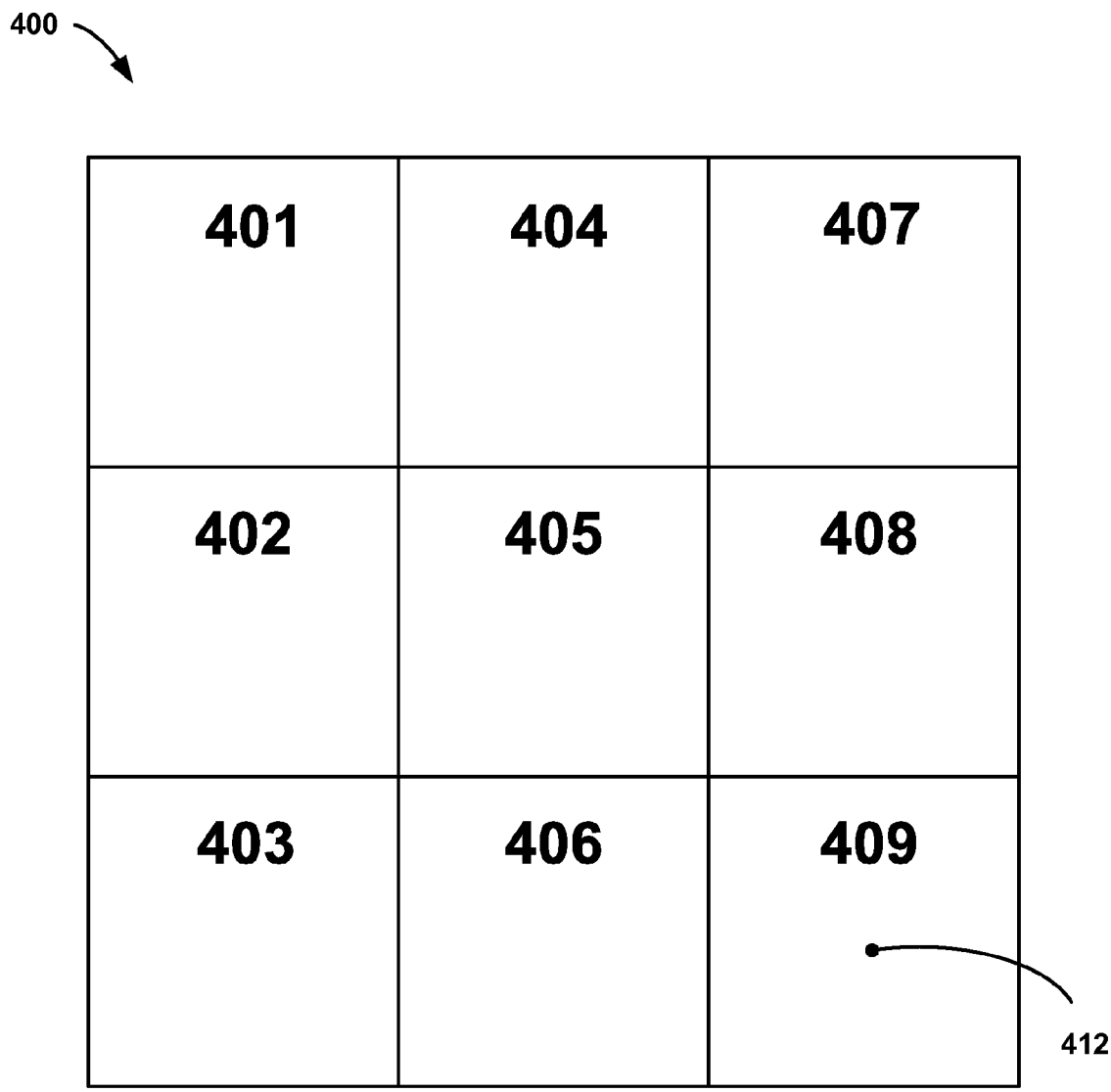
FIG. 4 is a depiction of a first grid in accordance with an exemplary embodiment.

The analysis module 124 may identify mobile events of a mobile station that occurred at a given location in a variety of ways. For example, the analysis module 124 may identify an area surrounding the given location and may treat mobile events that occurred within the area as mobile events that occurred at the given location. As a particular example of identifying an area surrounding the given location, analysis module 124 may use a grid. Specifically analysis module 124 may place a grid over an area for which the wireless communication system 100 provides coverage. FIG. 4 depicts a grid 400 that overlays an example area. As shown, the grid 400 breaks the area into nine grid sections 401-409. In an example, the grid sections are each 500×500 meters. However, it should be understood that the grid sections may be any suitable shape and size. For example, the size may be smaller or larger than 500×500 meters (e.g., 100×100 meters or 1,000×1,000 meters). Further, although the grid sections are depicted as square sections, the grid sections may be any suitable shape.

After placing a grid over an area, the analysis module 124 may determine the grid sections that the identified mobile events of mobile station 112 occurred in. Each grid section may have a border well-defined by latitude and longitude values, and using the determined locations of the mobile events (e.g., the determined latitude and longitude of each mobile event), the analysis module 124 may place each mobile event in the appropriate grid section. The analysis module 124 may identify which grid section the subscriber's billing address is located in. For example, billing address 412 may be located in grid section 409, as depicted in FIG. 4. The analysis module 124 may then treat the mobile events that occurred in the grid section 409 as mobile events that occurred at the billing address 412. Beneficially, by treating all mobile events that occurred in the grid section 409 as mobile events that occurred at billing address 412, all mobile events that actually occurred at billing address 412 will likely be taken into account by the analysis module 124.

Figure 5:
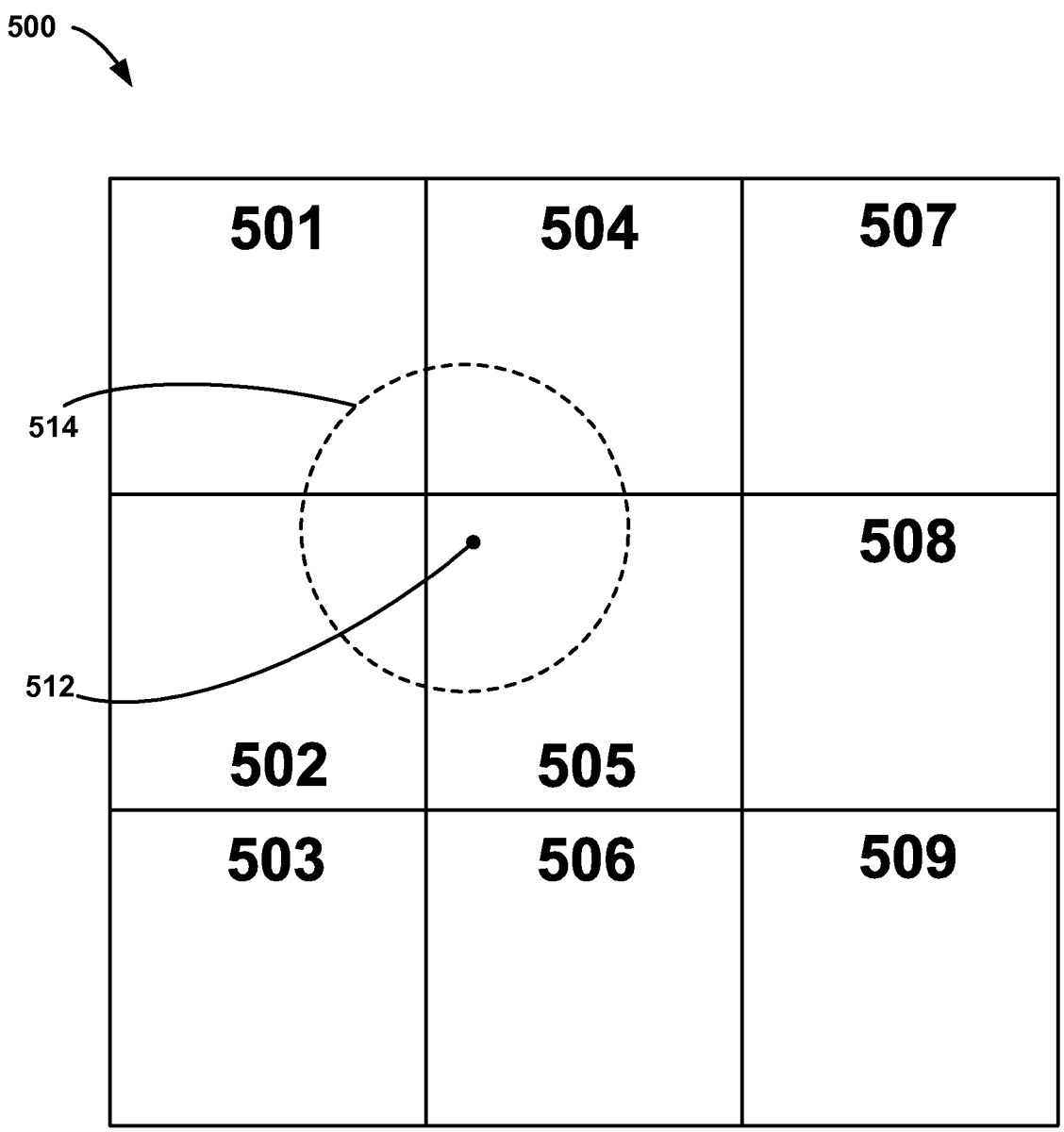
FIG. 5 is a depiction of a second grid in accordance with an exemplary embodiment.

However, in some examples, the billing address may be located near a corner or edge of a grid section. In such an example, all mobile events that actually occurred at that billing address will likely not be taken into account by the analysis module 124 if the module 124 only treats mobile events that occur in the grid section encompassing the billing address as mobile events that occurred at the billing address. For example, FIG. 5 depicts an area 500 having grid sections 501-509 and where billing address 512 is located at the top left corner of grid section 505. In this case, a mobile station operating at the billing address may experience poor coverage at locations that are located in grid sections other than grid section 505. For example, the mobile station operating at billing address 512 may experience poor coverage at locations that are located in grid sections 501, 502, 504, and 505. Thus, in this case, treating only mobile events that occurred in grid section 505 as mobile events that occurred at the billing address may result in not identifying all mobile events that occurred at the billing address.

Analysis module 124 may determine that a billing address is located near a corner or edge of a grid section. In such a case, the analysis module 124 may identify an area of a given radius around the given location, such as area 514. In an example, the radius may be a radius that corresponds to the range of a femtocell, such as 100 meters. The analysis module 124 may then identify each grid section that overlaps with the identified area, and then may treat mobile events that occurred in the identified grids as mobile events that occurred at the given location. In this example, grid sections 501, 502, 504, and 505 each have portions that are located in area 514. Thus, the analysis module 124 may treat mobile events that occur in grid sections 501, 502, 504, and 505 as mobile events that occurred at billing address 512.

After determining all of the mobile events that occurred at the given location associated with the subscriber's billing address, such as billing address 412 or billing address 512, the analysis module 124 may analyze those mobile events to determine a level of wireless performance experienced by the mobile station at the given location. Generally, the level of wireless performance is an indication of how well the mobile station 112 performs at the location and this level of wireless performance experienced by the mobile station at the billing address may be determined in various ways. In an example, the analysis module 124 may treat a ratio of negative mobile events to total mobile events as the level of wireless performance experienced by the mobile station at the given location. In order to do so, the analysis module 124 may first determine the number of negative mobile events that occurred at the given location. As mentioned above, these negative mobile events may include blocked calls, dropped calls, and roaming events. Other example negative mobile events are possible as well. The analysis module 124 may determine a ratio of the number of negative mobile events to a number of total mobile events that occurred at the given location, and this ratio may provide an indication of how well the mobile station 112 performs at the location. In another example, the analysis module may treat the total number of negative mobile events as the level of wireless performance experienced by the mobile station at the given location.

In a particular example of the disclosed method and system, the analysis module 124 may be configured to filter out network anomalies or aberrations from the analysis of the level of wireless performance experienced by the mobile station at the given location. Network anomalies may occur for various reasons. For example, a network anomaly may be caused by a natural disaster, such as an earthquake or a flood. In another example, a network anomaly may be caused by a base station fire. Other causes of network anomalies are possible as well, such as a base station or RAN equipment failure. These network anomalies may result in a disruption in wireless coverage, which in turn may result in negative mobile events, such as dropped calls or blocked calls. Negative mobile events that occur during a network anomaly are likely due to the network anomaly itself and not due to poor coverage at the given location. Accordingly, the analysis module 124 may be configured to not treat negative mobile events that occurred due to a network aberration as a negative mobile event that occurred at the given location, thus filtering out mobile events that occurred as a result of the network anomaly.

After determining the level of wireless performance experienced by the mobile station at the billing address, the analysis module 124 may analyze the determined level of wireless performance to determine whether the level of wireless performance experienced by a mobile station of the subscriber at the billing address is less than the threshold level. The threshold level may be any suitable threshold level. For example, the threshold may be a given percentage of negative mobile events to total mobile events, such as 5%, 10%, 15%, etc. In a particular example, in order to determine an appropriate or suitable threshold, a wireless service provider may determine a wireless performance threshold level that leads toward a likelihood that a subscriber leave the wireless service provider, perhaps to switch to another wireless service provider. For example, a given level may be associated with a 25% percent chance or likelihood that a subscriber leave a wireless service provide.

In addition to the methods described above for determining that a level of wireless performance experienced at a given location associated with the billing address is less than a threshold level, other example ways of making this determination are possible as well. For instance, in another example of method 300, determining that a level of wireless performance experienced at a given location by the mobile station is less than a threshold level may involve identifying a coverage level at a given location and determining that the identified coverage level is less than a threshold level. The threshold level may be any suitable threshold level. For example, the threshold may be a given RF signal level.

The coverage level at the given location may be determined based on coverage map data. This coverage map data may be obtained in ways known in the art or later developed. For example, coverage map data may be actual coverage data from mobile events of a plurality of other subscribers. Additionally or alternatively, coverage map data may be data from coverage predictions based on base station azimuth, beamwidth, power, and so forth. In an example, the analysis module may use both types of coverage data, while weighting coverage data based on actual coverage data from mobile events of a plurality of other subscribers more heavily than coverage data based on coverage predictions, because coverage data based on actual mobile-event data may provide a more reliable indication of actual coverage at the given location.

Further, the analysis module 124 may consider additional data may in order to determine that a level of wireless performance experienced at a given location associated with the billing address is less than a threshold level. For instance, the analysis module 124 may base this determination at least in part on CDR data. As another example, the analysis module 124 determine whether a call history of a subscriber indicates that the subscriber does not attempt to place phone calls at the given location due to poor wireless performance at the given location. For instance, the analysis module may determine that (i) the coverage level at the billing address is less than a threshold level and (ii) the call history indicates that the subscriber attempts to place a number of calls less than a threshold (e.g., five (5) or fewer calls per month). In such a case, it is possible that the subscriber simply does not attempt to place phone calls at the given location due poor wireless performance at the given location. The analysis module 124 may consider other data as well.

Still further, it should be understood that the analysis module 124 may make this determination that a level of wireless performance experienced at a given location associated with the billing address is less than a threshold level based on a combination of a variety of data. For example, the analysis module may take into account PCMD data, CDR data, and coverage data in order to determine that a level of wireless performance experienced at a given location associated with the billing address is less than a threshold level.

B. Determining that at Least One Cause of the Level of Wireless Performance being Less than a Threshold Level is a Network Issue Rather than a Mobile-Station Specific Issue After determining that the level of wireless performance experienced by the mobile station at the given location is less than the threshold, the analysis module 124 may determine whether the subscriber may benefit from using a femtocell at the given location. In order to determine whether the subscriber may benefit from using a femtocell at the given location, the analysis module 124 may determine that at least one cause of the level of wireless performance being less than the threshold level is a network issue rather than a mobile-station specific issue. When at least one cause of the level of wireless performance being less than the threshold level is a network issue rather than a mobile-station specific issue, it is likely that using a femtocell at the given location may facilitate improved wireless performance at the given location.

1. Poor Wireless Performance Due to a Network Issue

The analysis module 124 may determine that at least one cause of the level of wireless performance being less than the threshold level is a network issue rather than a mobile-station specific issue in a variety of ways. For example, the analysis module 124 may identify a given network issue at the given location. The analysis module 124 may then treat this identified given network issue as a cause of the level of wireless performance being less than the threshold level.

In an example of the disclosed method, the identified given network issue may be poor wireless coverage at the given location. The analysis module 124 may determine that there is poor coverage at the given location in a variety of ways. For instance, analysis module 124 may, based at least on coverage map data, determine that a level of coverage at the given location is below a threshold. Responsive to the determination that a level of coverage at the given location is below a threshold, the system may identify the level of coverage at the given location as the network issue that is a cause of the level of wireless performance being less than the threshold level.

As mentioned above, coverage map data may be obtained in ways known in the art or later developed. For example, coverage map data may be data based on actual coverage data or data based on predicted coverage. Further, as mentioned above, the analysis module 124 may weigh data based on actual coverage data more heavily that data based on predicted coverage, since the actual coverage data may provide a more reliable indication of the coverage level at the given location. Still further, the threshold for the coverage level may be any suitable threshold level. For example, the threshold may be a given RF signal level. As another example, the threshold may be a threshold associated with a given acceptable level of wireless performance (e.g., 95-100% call-completion rate). Of course, other example thresholds are possible as well.

In addition to poor coverage at a given location, other example network issues that may cause poor wireless performance at a given location are possible as well. For instance, the network issue may be that the given location is located at a border between one or more coverage areas. In such a case, since the mobile station is operating at a border between one or more coverage areas, the mobile station may ping-pong between the one or more coverage areas. As known in the art, ping-ponging may negatively affect wireless performance. Thus, in an example of method 300, the analysis module 124 may determine that the given location is located at a border between one or more coverage areas, and therefore that a mobile station operating at the given location is likely to experience ping-ponging. The analysis module 124 may then treat this ping-ponging as a network issue that is a cause of the level of wireless performance being less than the threshold level.

2. Poor Wireless Performance Due to a Mobile-Station Specific Issue

In some situations, the analysis module 124 may determine that the cause of the level of wireless performance being less than the threshold level is a mobile-station specific issue rather than a network issue. For instance, the analysis module 124 may identify a mobile-station specific issue, while the analysis module 124 is unable to identify a network issue at the given location. In such a case, the analysis module 124 may treat the mobile-station specific issue as the cause of the less-than-threshold wireless performance of the mobile station at the given location.

The analysis module 124 may identify mobile-station specific issues in a variety of ways. For example, the analysis module 124 may identify that a mobile-station specific issue exists when the mobile station suffers from poor wireless performance throughout the macro-network (e.g., poor wireless performance is not isolated to the given location, but rather poor wireless performance is experienced throughout all locations in the macro-network). Poor wireless performance throughout the macro-network may be caused by, for example, a defective radio component in the mobile station.

In an example, the analysis module 124 may determine poor wireless performance throughout the macro-network by analyzing CDR data associated with the mobile station. If the CDR data indicates that the mobile station suffered from a threshold number of dropped calls at each of a plurality of cell towers, it is likely that the mobile station suffers from a mobile-station specific issue. In such a case, the analysis module 124 may determine that the poor wireless performance at the given location results from a mobile-station specific issue. On the other hand, if the CDR data indicates that the mobile station suffered from a threshold number of call drops at the cell tower associated with the billing address but did not suffer from a threshold number of call drops at other cell towers, it is likely that the mobile station operates reliably. In such a case, the analysis module 124 may determine that the poor wireless performance at the given location results from a network issue.

As another example, the analysis module 124 may determine that the mobile station is associated with a history of poor wireless performance. For instance, mobile stations of the same or similar model, and/or mobile stations having the same or similar age, may have a documented history or poor wireless performance. If the mobile station is associated with a history of poor wireless performance and the analysis module 124 is unable to identify a network issue at the given location, the analysis module 124 may determine that the cause of the level of wireless performance being less than the threshold level is a mobile-station specific issue rather than a network issue.

In response to identifying that the cause of the level of wireless performance being less than the threshold level is a mobile-station specific issue rather than a network issue, the computer system 120 may initiate a process of offering to remedy the mobile-station specific issue. Any offer to remedy the mobile-station specific issue is possible. For instance, the offer to remedy the mobile-station specific may involve a variety of one or more remedies, such as an offer to repair the mobile-station specific issue or an offer for a new mobile station.

3. Poor Wireless Performance Due to Both a Network Issue and a Mobile-Station Specific Issue It should be understood that, in some situations, the less-than-threshold wireless performance of the mobile station at the given location may be due to both a network issue(s) and a mobile-station specific issue(s). However, in such a situation, it may also be likely that one of the network issue or the mobile-station specific issue plays a greater role in causing the poor wireless performance than the other issue. In other words, either the network issue or the mobile-station specific issue may be the primary cause of the less-than-threshold level of wireless performance at the given location, and the other issue may be a secondary cause. For example, the wireless performance of mobile station 112 at the subscriber's billing address may be less than a threshold level because (i) the given location has poor wireless coverage and (ii) the mobile station has a defective radio component. However, the network issue may be the primary cause of the less-than-threshold level of wireless performance at the given location, whereas the mobile-station specific issue may be a secondary cause of the less-than-threshold level of wireless performance at the given location.

Accordingly, in an example of method 300, the analysis module 124 may determine whether the primary cause of the poor wireless performance at the given location is a network issue or a mobile-station specific issue. Determining the primary cause of the poor wireless performance may help the analysis module 124 determine whether a femtocell would facilitate improved wireless performance at the given location. For example, if the system determines that the primary cause of the less-than-threshold wireless performance of the mobile station is a network issue, a femtocell may serve to improve the wireless performance at the given location. On the other hand, if the system determines that the primary cause of the less-than-threshold wireless performance of the mobile station is a mobile-station specific issue and the network issue is a secondary cause, a femtocell may not improve or substantially improve the wireless performance at the given location.

In an example, determining that a primary cause of the level of wireless performance being less than the threshold level is a network issue rather than a mobile-station specific issue may involve (i) identifying a network issue at the given location as the primary cause of the level of wireless performance being less than the threshold level and (ii) ruling out a mobile-station specific issue as the primary cause of the level of wireless performance being less than the threshold level. In other words, the analysis module 124 may determine that an identified network issue has a greater impact on causing the less-than-threshold wireless performance than a mobile-station specific issue.

Analysis module 124 may rule out a mobile-station specific issue as the primary cause of the level of wireless performance being less than the threshold level in a variety of ways. For instance, in order to rule out a mobile-station specific issue as the primary cause of the level of wireless performance being less than the threshold level, the analysis module 124 may determine that the mobile station generally performs well in the macro-network. For instance, analysis module 124 may make a determination that a macro-network-wide level of wireless performance experienced by the mobile station in the macro-network is above a given threshold level. This given threshold level may, for example, be a percentage of negative mobile events that occurred in the macro-network compared to total mobile events that occurred in the macro-network. Thus, analysis module 124 may determine that the mobile station is capable of performing at a given level in the macro-network, and therefore the poor performance at the given location is not likely due to a problem with the mobile station. Responsive to making this determination, analysis module 124 may determine that a mobile-station specific issue is not the primary cause of the level of wireless performance being less than the threshold level.

In another example of method 300, the analysis module 124 may determine whether a mobile-station specific issue is a cause (e.g., primary cause) of the level of wireless performance being less than the threshold level by analyzing a history of wireless performance associated with the given mobile station. The analysis module 124 may identify a model of the mobile station and make a determination that the identified model of the mobile station is associated with a history of wireless performance that is above a threshold level (e.g., a given percentage of negative mobile events to total mobile events, such as 1-5%). Responsive to making this determination, the analysis module 124 may determine that mobile-station specific issue is not the primary cause of the level of wireless performance being less than the threshold level.

In a particular example of the disclosed method, if the given mobile station is associated with a history of threshold-low wireless performance (e.g., poor wireless performance) and the wireless coverage at the given location is above a threshold, the analysis module 124 may then treat the primary cause of the level of wireless performance being less than the threshold level as a mobile-station specific issue. On the other hand, if the given mobile station is associated with a history of threshold-high wireless performance (e.g., good wireless performance), the analysis module may rule out a mobile-station specific issue as the primary cause of the level of wireless performance being less than the threshold level.

The history of wireless performance may be based on historical wireless performance of a plurality of mobile stations of the same model and having an age within a given age range, wherein the given age range ranges from (i) an age that is a first threshold amount below the age of the mobile station (e.g., less than one year), and (ii) an age that is a second threshold amount above the age of the mobile station (e.g., one or more years older than the mobile station). Thus, the analysis module 124 may analyze the performance history of mobile stations of the same model and having a similar age to the given mobile station.

Further, the history of wireless performance may be based on historical performance data from hundreds, thousands, or more of mobile stations of the same or similar model. Still further, as discussed above, the history of the wireless performance associated with the given mobile station may also take into account the model and/or age of the plurality of mobile stations. As is known in the art, mobile stations of different models may meet different performance specifications, and thus some mobile stations may perform more reliably than others. Yet still further, the age of a mobile station may affect performance of the mobile station. For instance, a mobile station may be associated with good wireless performance in the beginning stages of the life of the mobile station (e.g., when the mobile station is 0-2 years old). However, wireless performance of the mobile station may decrease during the later stages of the life of the mobile station (e.g., when the mobile station is 2+ years old).

In a particular example, the radio of a first model may perform according to a first set of performance specifications, while the radio of a second model may perform according to a second set of performance specifications. The first set of performance specifications may be of a higher standard than the second set of specifications, so the mobile stations of the first model may typically perform more reliably than mobile stations of the second model. For instance, mobile stations of the first model may typically perform reliably for the first 2.5 years of the life of the device, while mobile stations of the second model may typically perform reliably for the first 1 year of the mobile stations life. The analysis module 124 may take such performance-history data into account when determining whether a cause of the less-than-threshold wireless performance is a mobile-station specific issue.

It should be appreciated that, although a mobile-station issue may be a primary cause of the less-than-threshold wireless performance and a network issue may be a secondary cause, a femtocell may improve wireless performance at the given location for a subscriber. In such a case, although the network issue is a secondary cause, it is still the case that at least one cause of the level of wireless performance being less than the threshold level is a network issue rather than a mobile-station specific issue. Accordingly, in such a case, it may still be appropriate to initiate a process of offering to provide a femtocell to the subscriber.

ii. Initiating a Process of Offering to Provide a Femtocell to the Subscriber

After determining that the subscriber is a candidate that may benefit from using a femtocell at the billing address, femtocell-offering module 126 initiates a process of offering to provide a femtocell to the subscriber at step 306. In general, offering to provide the femtocell to the subscriber may involve offering to provide the femtocell for installation of the femtocell at the given location, so as to improve the level of wireless performance experienced by the mobile station when the mobile station is at the given location. In accordance with the disclosed method and system, the offer to provide a femtocell to the subscriber may be any offer related to a femtocell, such as an advertisement for a femtocell or an offer to provide a free femtocell.

The femtocell-offering system may initiate the process of offering to provide a femtocell to a subscriber and/or offer a femtocell to a subscriber in a variety of ways. For instance, femtocell-offering module 126 may be configured to send a text message or an email message to the subscriber. In another example, the femtocell-offering module 126 may be configured to load the subscriber's mobile-station number into an automatic dialer, and a customer service representative may offer a femtocell to the dialed subscriber. As yet another example, the femtocell-offering module 126 may be configured to print out a letter to the subscriber, and the letter may then be mailed to the subscriber's billing address via postal mail.

In still yet another example, the offer to provide the femtocell to the subscriber may be a web-based message. The wireless service provider may have a website that a user may log into in order to access the subscriber's account information. The system may provide an offer for providing a femtocell to the subscriber on the wireless service provider website. For instance, the system may be configured to offer a femtocell to the subscriber when the subscriber logs into the subscriber's account on the website.

The femtocell-offering module may also initiate a process of offering a femtocell to the subscriber by flagging a profile of the subscriber in some sort of way, and the flag may serve to indicate that the subscriber is a candidate to which to offer a femtocell. A flagged profile may be useful to a customer-service representative of a wireless service provider. For instance, when a subscriber enters a store of the wireless service provider, a customer-service representative may pull up the profile of the subscriber. The customer-service representative may see the flag and may then know to offer a femtocell to the subscriber or discuss femtocell benefits with the subscriber. Other examples of initiating the process or offering a femtocell to a subscriber and/or offering a femtocell to a subscriber are possible as well.

iii. Additional Factors

Additional factors may be taken into consideration when identifying a candidate to which to offer a femtocell. For example, the system 120 may take into account the value of a subscriber to the wireless service provider (herein referred to as "marketing treatment value") when determining candidates that may benefit from using a femtocell. In an example, a wireless service provider may create general categories of marketing treatment values such as categories of low marketing treatment value, medium marketing treatment value, and high marketing treatment value. Additional or alternative categories are possible as well. Each marketing treatment value category may be associated with range of marketing treatment values (e.g., from a low threshold marketing treatment value to a high threshold marketing treatment value). The marketing treatment value may be determined in various ways. As an example, the marketing treatment value may reflect a subscriber's net present value to the wireless service provider. This net present value may take into account, for example, the customer's monthly recurring charge (MRC), the customer's credit class, and a prediction of the customer's future value.

System 120 may use the marketing treatment value of a subscriber as an additional element when determining whether to offer a femtocell to the subscriber. In an example of when system 120 takes marketing treatment value into account, if the marketing treatment value is above a threshold (e.g., a given marketing treatment value such as a net present value of $20.00 per month), the system 120 initiates a process of offering a femtocell to the subscriber. However, if the marketing treatment value is not above the threshold, the system 120 does not offer the subscriber a femtocell responsive to making the first and second determinations. This may beneficially increase the customer satisfaction of subscribers that are high-value subscribers.

In another example of when system 120 takes marketing treatment value into account, if the marketing treatment value is below a threshold, the system 120 initiates a process of offering a femtocell to the subscriber. Offering a femtocell to subscriber with a low marketing treatment value may beneficially improve wireless service for the subscriber. In addition to improving customer satisfaction, this may beneficially spur the subscriber to communicate more. As a result, this may increase the subscriber's marketing treatment value.

A femtocell typically has a range that spans an area having a radius of about 100 meters. Further, the location determined by a triangulation position-determining process typically has an accuracy of around 250 meters. Still further, in some examples, the grid section size used by analysis module 124 may be larger than the area the billing address actually encompasses. For example, each grid may be sized 1000× 1000 meters, while the billing address only encompasses an area that is 75×75 meters. However, analysis module 124 may use the larger grid size to facilitate faster processing time of the mobile event data.

Due to the above, in some situations there may be some mobile events that the system 120 treats as negative mobile events that occurred at the billing address location even though the mobile events were not actually mobile events that occurred at the billing address location. In particular, this possibility may be due to, for example, the fact that the accuracy of the determined location may be off by an amount that is greater than the range of a femtocell. Additionally or alternatively, this possibility may be due to the fact that a grid section size used to analyze mobile event data may be larger than the area the billing address actually encompasses. In an example, system 120 may end up treating mobile events that occurred at a neighbor's house or a convenient store down the street as mobile events that occurred at the billing address. Accordingly, the disclosed method and system may result in situations where the system offers a femtocell to a subscriber even though using a femtocell at the subscriber's billing address would not actually improve wireless performance at the billing address. However, even with such potential identifications of mobile events that do not actually occur at the billing address, there will be an overall benefit in customer satisfaction for most subscribers of a wireless service provider.

5. Example Advantages of the Disclosed System and Method

Beneficially, the disclosed system and method may help to improve wireless service subscriber's satisfaction, by facilitating improved wireless performance at a billing address location where a subscriber experiences poor wireless performance, where at least one cause of the poor wireless performance is a network issue rather than a mobile-station specific issue. Wireless service providers may also benefit from the disclosed method and system, as the method and system may provide a way to lower or minimize subscriber turnover due to poor wireless performance at the subscriber's home. In addition, by determining that at least one cause of the level of wireless performance being less than the threshold level is a network issue rather than a mobile-station specific issue, a wireless service provider may beneficially avoid a situation in which the provider offers a femtocell to the subscriber, even though the femtocell would not improve or substantially improve the wireless performance at the given location.

6. Conclusion

Various exemplary embodiments have been described above. Those skilled in the art will understand, however, that changes and modifications may be made to those examples without departing from the scope of the claims.

I claim:

1. A method comprising:
   a computer system making a first determination (i) that a level of wireless performance experienced by a mobile station of a subscriber at a given location is less than a threshold and (ii) that at least one cause of the level of wireless performance being less than the threshold level is a network issue rather than a mobile-station specific issue;
   the computer system making a second determination that the given location is a location associated with a billing address of the subscriber; and
   responsive to making the first and second determinations, the computer system initiating a process of offering to provide a femtocell to the subscriber.

2. The method of claim 1, wherein making the first determination comprises:
   the computer system identifying a given network issue at the given location; and
   the computer system treating the given network issue as a cause of the level of wireless performance being less than the threshold level.

3. The method of claim 2, wherein identifying the given network issue at the given location comprises:
   based at least on coverage map data, making a third determination the a level of coverage at the given location is below a threshold; and
   responsive to the third determination, identifying the level of coverage at the given location as the given network issue.

4. The method of claim 3, wherein the coverage map data comprises coverage map data based at least on data from mobile events of a plurality of other subscribers.

5. The method of claim 1, wherein the computer system making the first determination (i) that a level of wireless performance experienced by a mobile station of a subscriber at a given location is less than a threshold and (ii) that at least one cause of the level of wireless performance being less than the threshold level is a network issue rather than a mobile-station specific issue, comprises:
   the computer system determining (i) that a level of wireless performance experienced by a mobile station of a subscriber at a given location is less than a threshold and (ii) that a primary cause of the level of wireless performance being less than the threshold level is a network issue rather than a mobile-station specific issue.

6. The method of claim 5, wherein determining that a primary cause of the level of wireless performance being less than the threshold level is a network issue rather than a mobile-station specific issue comprises:
   identifying a network issue at the given location as the primary cause of the level of wireless performance being less than the threshold level; and
   ruling out a mobile-station specific issue as the primary cause of the level of wireless performance being less than the threshold level.

7. The method of claim 6, wherein ruling out a mobile-station specific issue as the primary cause of the level of wireless performance being less than the threshold level comprises:
   making a third determination that a macro-network-wide level of wireless performance experienced by the mobile station in the macro-network is above a second threshold level; and
   responsive to making the third determination, determining that a mobile-station specific issue is not the primary cause of the level of wireless performance being less than the threshold level.

8. The method of claim 7, wherein the second threshold level is a percentage of negative mobile events that occurred in the macro-network compared to total mobile events that occurred in the macro-network.

9. The method of claim 6, wherein ruling out a mobile-station specific issue as the primary cause of the level of wireless performance being less than the threshold level comprises:
   identifying a model of the mobile station;
   making a third determination that the identified model of the mobile station is associated with a history of wireless performance that is above a second threshold level; and
   responsive to making the third determination, determining that mobile-station specific issue is not the primary cause of the level of wireless performance being less than the threshold level.

10. The method of claim 9, wherein the history of wireless performance is based on historical wireless performance of a plurality of mobile stations of the same model.

11. The method of claim 6, wherein ruling out a mobile-station specific issue as the primary cause of the level of wireless performance being less than the threshold level comprises:
    identifying an age of the mobile station and a model of the mobile station;
    making a third determination that the identified age and model of the mobile station are associated with a history of wireless performance that is above a second threshold level;
    responsive to making the third determination, determining that mobile-station specific issue is not the primary cause of the level of wireless performance being less than the threshold level.

12. The method of claim 11, wherein the history of wireless performance is based on historical wireless performance of a plurality of mobile stations of the same model and having an age within a given age range, wherein the given age range ranges from (i) an age that is a first threshold amount below the age of the mobile station, wherein the first threshold amount is less than one year, and (ii) an age that is a second threshold amount above the age of the mobile station.

13. The method of claim 1, wherein offering to provide a femtocell to the subscriber comprises offering to provide the femtocell to the subscriber for installation of the femtocell at the given location, so as to improve the level of wireless performance experienced by the mobile station when the mobile station is at the given location.

14. The method of claim 1, wherein the threshold level is a percentage of negative mobile events that occurred at the given location compared to total mobile events that occurred at the given location.

15. The method of claim 1, wherein the threshold level is associated with a high propensity to leave a wireless service provider, and wherein the high propensity is a propensity greater than 25%.

16. The method of claim 1, wherein initiating a process of offering to provide a femtocell to the subscriber comprises the computer system flagging a profile of the subscriber with a flag, wherein the flag serves to indicate that the subscriber is a candidate to which to offer to provide a femtocell.

17. The method of claim 1, wherein the process comprises a communication to the subscriber, wherein the communication is selected from the group consisting of an email message, a text message, a phone call, a web-based message, and a letter sent via postal mail.

18. The method of claim 1, further comprising:
after the computer system initiating a process of offering to provide a femtocell to the subscriber, offering to provide the femtocell to the subscriber.

19. A system for offering to provide a femtocell to a subscriber, the system comprising:
a position-determining module;
an analysis module; and
a femtocell-offering module,
wherein the position-determining module is configured to, for each of a plurality of mobile events of a mobile station of a given subscriber, determine a location where the mobile event occurred,
wherein the analysis module is configured to (i) make a first determination (a) that a level of wireless performance experienced by a mobile station of a subscriber at a given location is less than a threshold and (b) that at least one cause of the level of wireless performance being less than the threshold level is a network issue rather than a mobile-station specific issue, and (ii) make a second determination that the given location is location associated with a billing address of the subscriber,
wherein the femtocell-offering module is configured to initiate a process of offering a femtocell to the subscriber responsive to the first and second determinations.

20. The system of claim 19, wherein the position-determining module, the analysis module, and the femtocell-offering module each comprise at least one processor.

21. The system of claim 19, wherein the position-determining module, the analysis module, and the femtocell-offering module share a processor.

* * * * *